United States Patent [19]
Roy

[11] Patent Number: 5,257,736
[45] Date of Patent: Nov. 2, 1993

[54] SELF-REGULATING AIR VENTILATION APPARATUS

[76] Inventor: Donald Roy, 75 Mathieu St., Drummondville, Canada, J2C 2S7

[21] Appl. No.: 925,175

[22] Filed: Aug. 6, 1992

[51] Int. Cl.⁵ .............................................. F24F 7/08
[52] U.S. Cl. ................................. 236/49.3; 236/44 R; 454/239; 165/16; 165/17; 165/54
[58] Field of Search ................... 236/49.3, 44 R, 44 A, 236/44 E; 165/16, 17, 54; 454/239, 909, 256, 343

[56] References Cited

U.S. PATENT DOCUMENTS

| | | | |
|---|---|---|---|
| 4,619,114 | 10/1986 | Wilson | 62/180 |
| 4,653,574 | 3/1987 | Quinlisk et al. | 165/54 |
| 4,905,579 | 3/1990 | Dame | 165/54 X |
| 4,953,784 | 9/1990 | Yasufuku et al. | 236/49.3 X |
| 5,024,263 | 6/1991 | Laine et al. | 165/54 X |
| 5,119,987 | 6/1992 | Kobayashi | 236/49.3 |

FOREIGN PATENT DOCUMENTS

| | | | |
|---|---|---|---|
| 2529308 | 12/1983 | France | 165/54 |
| 0198936 | 12/1982 | Japan | 454/256 |
| 0064332 | 3/1990 | Japan | 165/54 |

*Primary Examiner*—Harry B. Tanner
*Attorney, Agent, or Firm*—Pierre Lespérance; Francois Martineau

[57] ABSTRACT

The present ventilating system is used for homes and buildings located in cold climate areas. The system includes a heat exchanger for extracting heat from the inside air discharged to the exterior and transferring said heat to the outside air admitted into the building. Blowers circulate air through the two paths of the heat exchanger and a motorized damper on the outside air path closes or opens the same. An integrated circuit and the following sensors serve to operate the system as follows: sensors detect the concentration of air contaminants, the humidity and the negative pressure of the air inside the building, while an outside air temperature sensor is also provided. When the level of air contaminants is above an adjustable preset level, the system operates in an inside air upgrading mode, namely air is circulated in both paths of the air exchanger; the same mode is used where humidity level is found to be excessive. When negative air pressure is detected, the system is operated to admit only outside air within the building, and if the outside air temperature is below a preset level, the system is operated in a heat exchanger de-icing mode for an adjusted time after each adjusted total time of system operation in either humidity or air-upgrading operating mode.

22 Claims, 8 Drawing Sheets

SELF-REGULATING AIR VENTILATION APPARATUS

FIELD OF THE INVENTION

The present invention relates to a ventilation system for homes and buildings located in cold climate areas.

BACKGROUND OF THE INVENTION

It is known to provide ventilation systems including a heat exchanger to extract the heat from the stale inside air discharged to the exterior and transfer this heat to the incoming outside air admitted into the building. However, such systems are designed to operate in a continuous manner at a predetermined rate of flow calculated in accordance with the building size and average number of occupants. Such systems are prone to waste operating energy, since they continue to function even when the air quality inside the building is much above standard norms.

Recently, sensors for detecting the concentration of air contaminants inside buildings have been developed and made to operate the ventilation system on a discontinuous basis, namely to stop operation of the system when the air contaminants level inside the building is below an adjustable preset value.

However, such sensors, when employed in a ventilation system using a heat exchanger as above described require operation of the ventilating system in a continuous manner as, for instance in Japanese patent No. 64,332 of Mar. 5, 1988 to Matsushita Saiko Co. Ltd. and entitled "VENTILATION AIR CONDITIONING DEVICE". It has been found that when the outside temperature is below about minus five degrees centrigrade, the heat exchanger core becomes clogged with ice, thereby putting the system out of commission.

It has also been found that in various ventilation systems, it often occurs that a negative air pressure develops inside the building, that is a pressure inferior to the outside air pressure, when, for instance, exhausting of kitchen odors and the like. This causes inrushing of cold air through interstices and the like in the building structure.

OBJECTS OF THE INVENTION

It is the general object of the present invention to provide a ventilation system which will overcome the above-noted disadvantages of existing ventilation systems.

It is another object of the invention to provide a ventilation system which can be used in association with existing hot air heating and/or air-cooling systems.

It is another object of the present invention to provide a modified, self contained ventilating system.

Another object of the present invention is to provide a ventilation system in which the operating parameters can be easily adjusted to suit any particular building in which the system is installed.

SUMMARY OF THE INVENTION

The ventilation system of the invention introduces outside air into an enclosed space and to exhaust the stale air from said space. The system comprises a heat exchanger having separate inside and outside air paths in heat-exchange relation in a heat exchanger core, a power-operated damper means in at least said outside air path, and separate power-operated inside and outside air-circulating means for circulating the air in said inside and outside air path, respectively, and an electric circuit including an air contaminants sensor located externally of the heat exchanger and directly exposed to the inside air in the enclosed space and generating a voltage output generally proportional to the concentration of air contaminants sensed in said enclosed space and circuit means to operate the system in an inside air quality upgrading mode, namely to open said damper means and to operate said first and second air-circulating means for lowering the proportion of air contaminants in said closed space. The operation of the system ceases when the air contaminants concentration has decreased below a preset adjustable value. The heat exchanger can be connected to outgoing and return ducts of an existing air-heating and/or cooling system in the building, in which case said existing system serves to circulate the air through the inside air and outside air paths of the heat exchanger. In such a system, motorized damper means are located in both said air paths. In an alternate embodiment, the heat exchanger is designed to be used as a separate unit, in which case two blowers are located in the heat exchanger to circulate the air in the separate air paths, but only one motorized damper is used, namely in the outside air path.

Preferably, the air contaminants sensor gives a first signal at a low contaminant concentration, in which case the air-circulating means operate at a low speed, and a second signal at a higher contaminant concentration, in which case the air-circulating means operate at a higher speed.

Preferably, there is provided an outside air temperature sensor exposed to the outside air and circuit means to operate the system in a heat exchanger de-icing mode, namely closing the outside air damper and operating the inside air-circulating means for a predetermined time when the outside air temperature is below a preset temperature. A de-icing mode timer is provided, which can be manually adjusted.

The system further includes an air-upgrading mode adjustable timer to adjust the total operating time in air quality upgrading mode, which elapses between two successive system operations in de-icing mode.

Preferably, an inside air-humidity sensor is provided and connected in parallel with the air contaminants sensor, so as to operate the system in air quality upgrading mode to decrease inside air humidity.

Preferably, a differential air pressure sensor is provided to detect the presence of negative pressure inside the building, compared to the outside air pressure. When such a state occurs, the ventilation system is operated in a pressure-equalizing mode, wherein the outside air damper is open and the outside air circulating system is operated admit outside air within the building while exhaust of inside air is prevented. Overriding means are provided in the circuit means whereby the operating modes take place in accordance with the following priorities:
 first priority: de-icing mode;
 second priority: air pressure equalizing mode;
 third priority: air quality upgrading mode.

The foregoing will become clearer by referring to the annexed drawings and the following detailed description.

DETAILED DESCRIPTION OF TWO PREFERRED EMBODIMENTS

Figure 1:
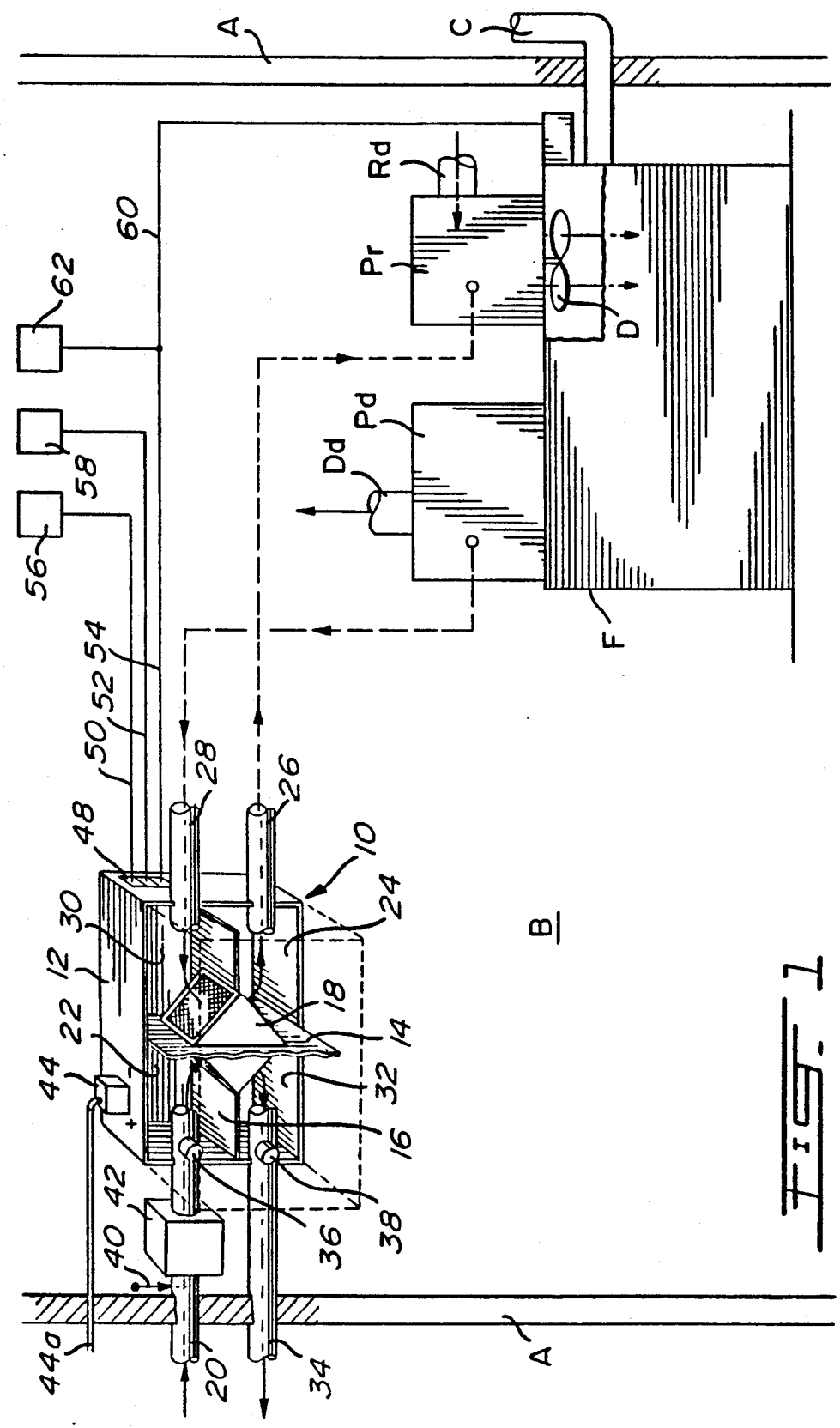
FIG. 1 is a view of the first embodiment of the invention showing the heat exchanger unit in perspective and connected to a conventional hot air heating system of a home.

The first embodiment is illustrated in FIGS. 1, 2, 3 and 3a. As shown in FIG. 1, the building walls A enclose a space B, in which is located a conventional hot air furnace F, which, for the purpose of illustration, may be gas or oil fired, and is provided with a chimney C. The furnace has an enclosed air-circulating means, such as one or two air blowers D, to circulate the heated air and distribute the same throughout the building through discharge plenum Pd and discharge duct network Dd. The air is returned to the furnace through the return duct network Rd and return plenum Pr. The conventional hot air system may include a cooling device for supplying cold air in summer-time.

In accordance with the invention, there is provided a ventilation system 10 comprising a heat exchanger casing 12 separated by a vertical partition 14 and a horizontal partition 16 into four compartments, which, together with a centrally-located and diagonally arranged heat exchanging core 18 (of known construction), define two separate air paths in heat-exchange relationship within the core 18, said air paths being defined as follows: an outside air path for outside air to be admitted within the enclosed space B and which includes a duct 20 opening at the exterior of the building, compartment 22 of casing 12, one path of core 18, compartment 24 of casing 12 and duct 26 which communicates with the return plenum Pr. It is understood that the air circulation means D located in the furnace will cause aspiration of fresh air from the exterior into the plenum Pr, which will be circulated throughout the building through the conventional ventilation system.

The heat exchanger also comprises an inside air path for the discharge of the state air to the outside of the building and which includes the discharge plenum Pd, a duct 28 connected thereto and opening within the compartment 30 of heat exchanger casing 12. The inside air path includes the other side of the heat exchanger core 18, the diagonally-opposite compartment 32 of casing 12 and a discharge duct 34 which opens at the exterior of the building. Duct 20 of the outside air path and duct 34 of the inside air path are both provided with a motorized damper 36 and 38, respectively. The dampers are normally closed and they open the ducts when their motors are actuated to permit air circulation through the ducts. The duct 20 of the outside air path is further provided with an outside temperature sensor 40 and an outside air preheater 42. This preheater 42 may be, for instance, an electric-resistant wire to heat the incoming outside air which flows through duct 20. Of course, this outside air could be heated by, for instance, a hot water coil regulated by an electro-valve. A differential air pressure sensor 44 is also provided, which measures the outside air pressure through a tube 44 opening at the exterior of the building and which also measures the enclosed air pressure and gives an electrical signal when a negative inside air pressure is detected, that is a pressure lower than the outside air pressure.

Figure 2:
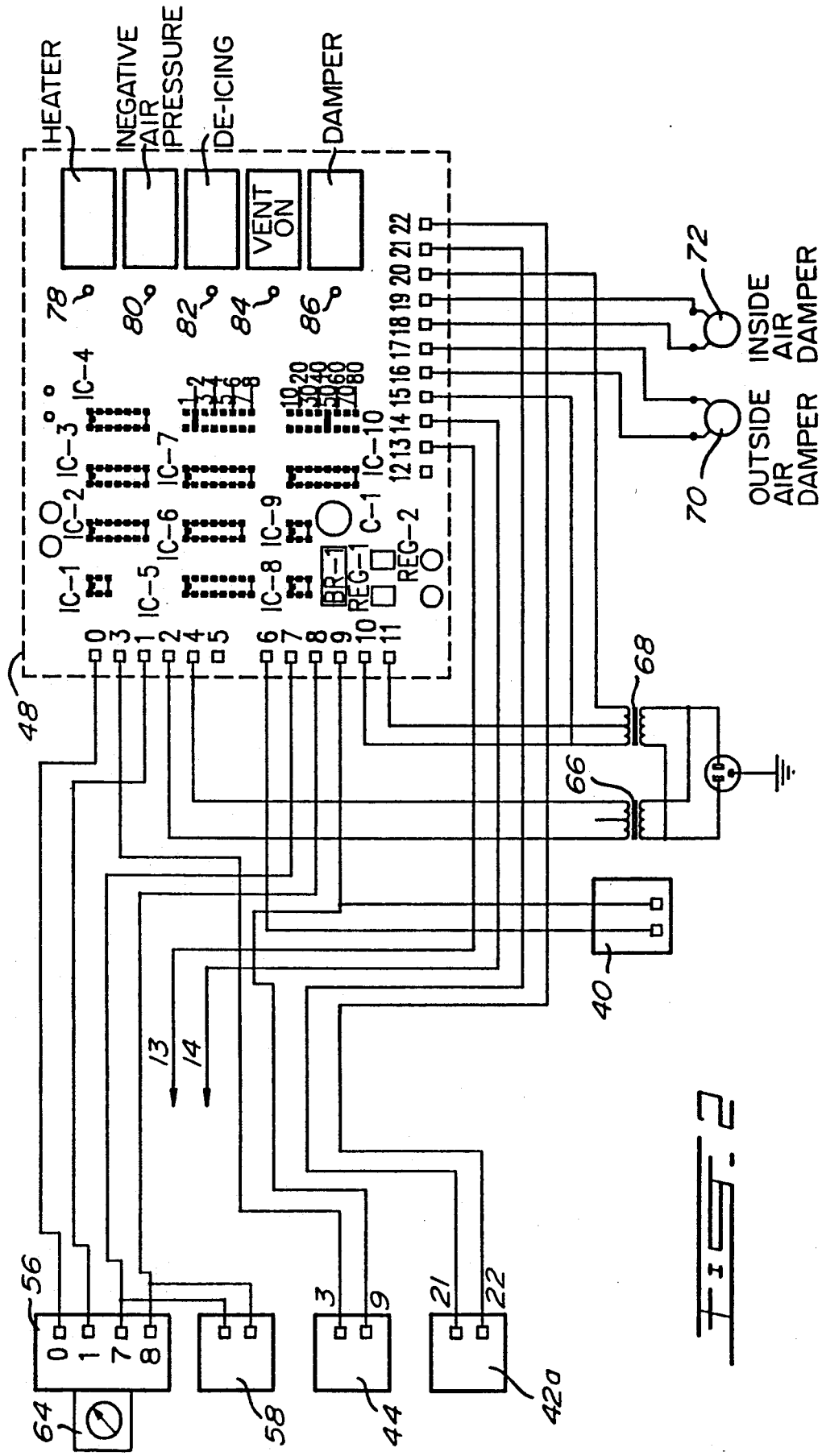
FIG. 2 is a diagram showing the integrated circuit board and its various terminals, said diagram used in conjunction with the embodiment of FIG. 1.
Figure 3:
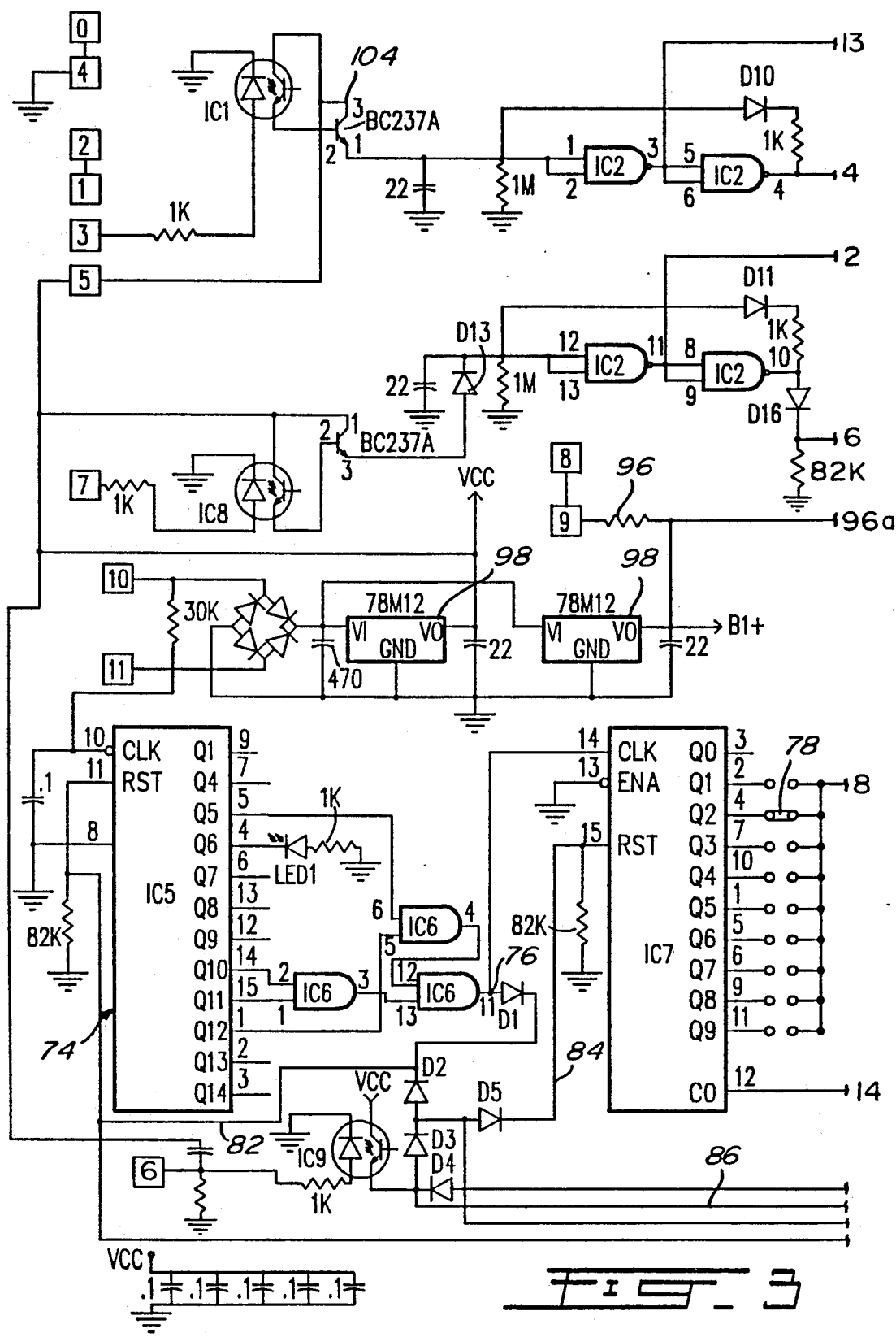
FIGS. 3 and 3a show the schematic diagram of the integrated circuit for the first embodiment.
Figure 3A:
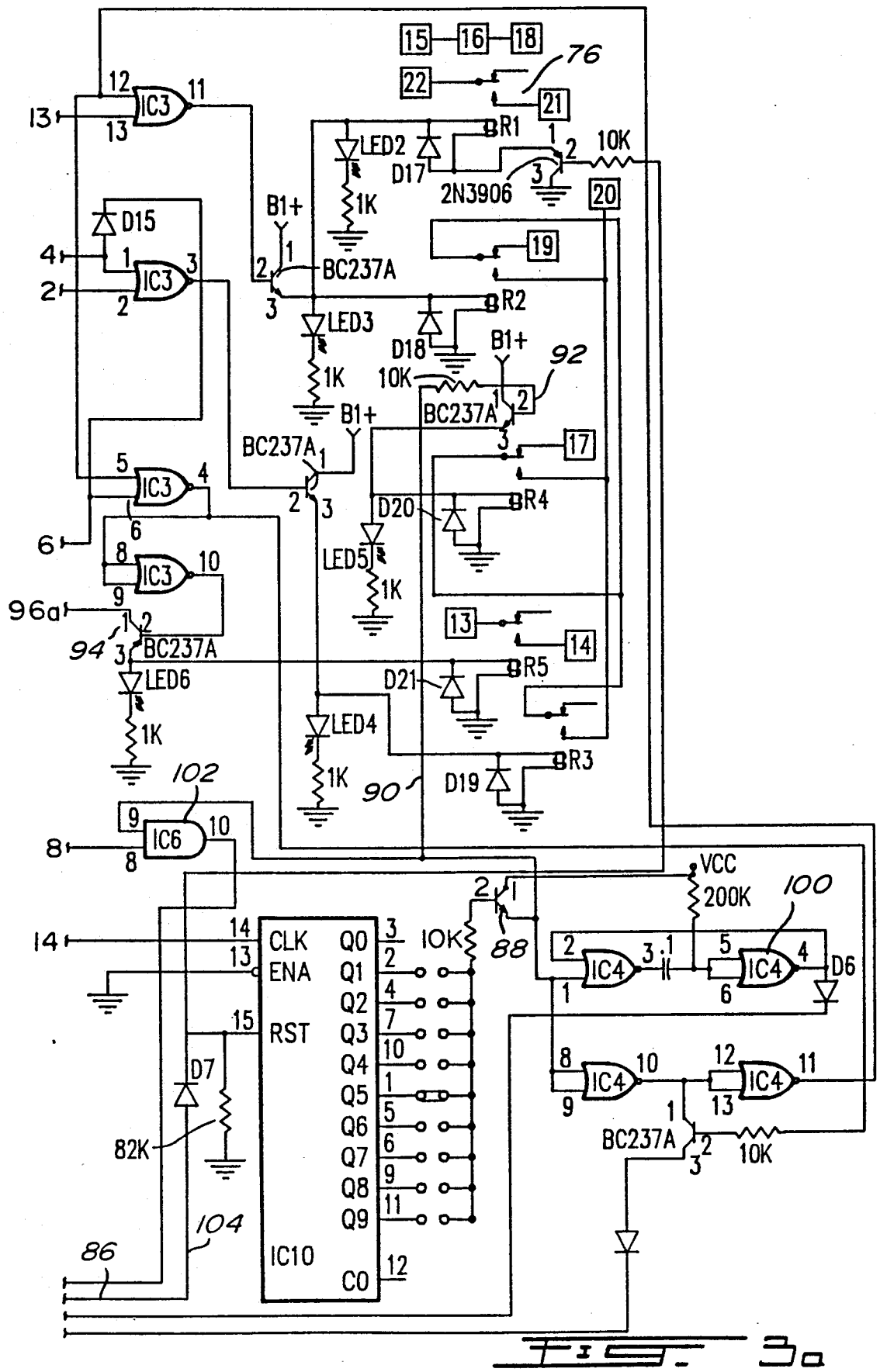
Figure 4:
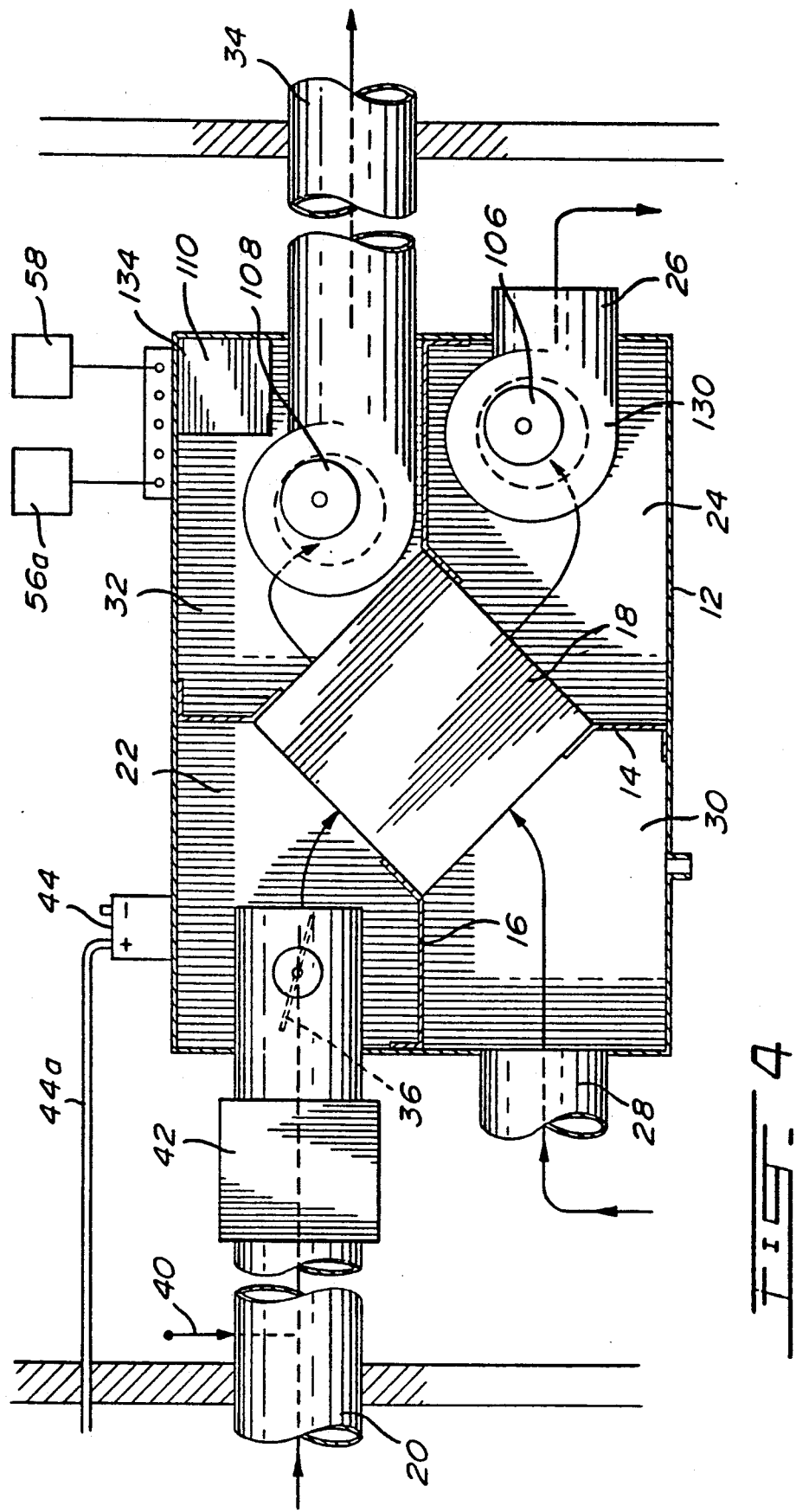
FIG. 4 is a vertical section of the ventilation system in accordance with the second embodiment, the system being used as an autonomous unit.

An integrated circuit, shown in FIGS. 2, 3, and 3a, is carried on a board 48 secured within the casing 12 and connected by wires 50, 52, 54 to an air contaminants sensor 56, to a humidity sensor 58 and in parallel with the conventional control circuit 60 for operating the air-circulating fans or blowers D located in the furnace F and normally controlled by the thermostat 62. Temperature sensor 40 and preheater 42 room are also connected to board 48.

Referring to FIGS. 2, 3 and 3A, the inside air contaminants sensor 56 is a semi-conductor unit emitting a voltage from zero to 10 volts proportional to the concentration of detected contaminants. Such contaminants include carbon dioxide, kitchen odors, tobacco smoke, solvent particles, human odors and the like. Such sensors are sold by a Swiss company, namely: FR SAUTER A. G. Two models are used in the present invention: the model used in FIG. 2 is manually adjustable, being provided with a knob 64 to adjust the contaminants concentration at which a signal is given by the sensor. For instance, the signal can be emitted anywhere between one and ten volts.

Figure 5:
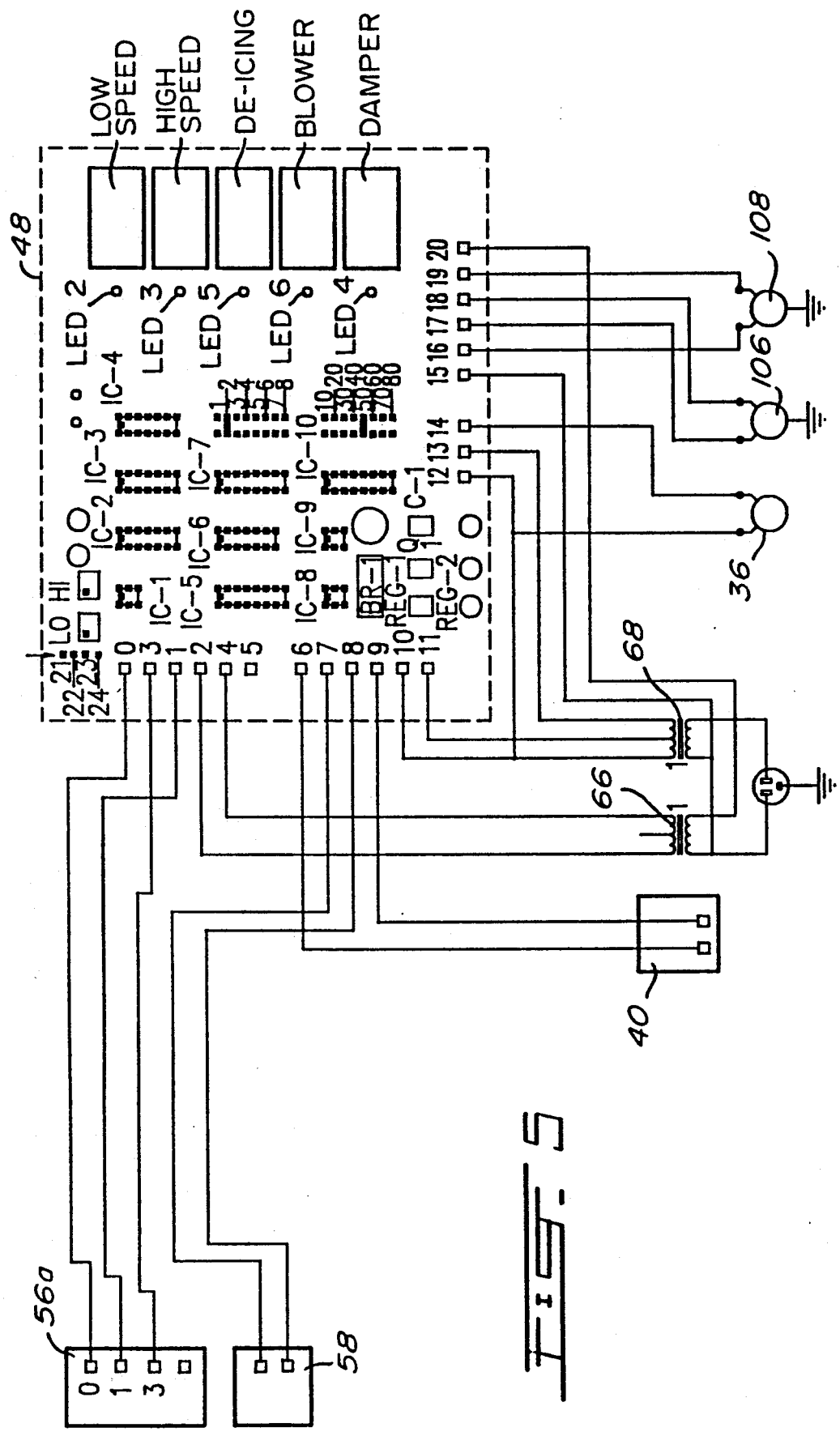
FIG. 5 is a schematic view of the integrated circuit board and its connections used with the embodiment of FIG. 4.

The sensor used in the second embodiment and illustrated in FIG. 5 is of the type which emits a voltage from zero to ten volts, depending on the contaminants concentration detected. Such a sensor is sold by the above-mentioned company under the code EGQ1F001.

Referring to FIGS. 1 and 2, the outside temperature sensor 40 is of the type which emits a signal when the outside temperature is about minus 5 degrees centigrade. The inside air humidity sensor 58 and the differential barometer 44 are sensors which emit a signal when the relative humidity is at a certain level and the negative pressure, that is the inside air pressure is a predetermined value below the outside air pressure.

The intergrated circuit board 48 has a series of terminals numbered 0 to 22, which are externally connected, as shown in FIG. 2 and which are internally connected to the integrated circuit as shown in FIGS. 3 and 3A.

Referring to FIG. 2, the air contaminants sensor 56 is supplied by its terminal 0 and 1, with a 24-volt A.C. source from a transformer 66. For this purpose, the terminals 0 and 4 and the terminals 1 and 2 of the board 48 are respectively interconnected as shown in FIG. 2. The other parallel-connected transformer 68 supplies 24 V A.C. to terminal 20 and to terminal 15, the latter also connected to terminals 16 and 18, as shown in FIG. 3A, and therefore this transformer supplies the two motors 70, 72 for actuating the dampers 36 and 38, respectively. Transformer 68 also supplies at terminals 10 and 11 (see also FIG. 3) the standard voltage supply, generally indicated at 74, for an integrated circuit system (see the bridge rectifier and voltage regulators 78M12 giving voltage C.C. and B1).

The humidity sensor 58 is connected in parallel (see FIG. 2) with the output of the air contaminants sensor 56. The differential barometer 44 is connected to terminals 3 and 9 of the circuit board 48. The outside air preheater 42 has its power supply and a relay, indicated at 42A in FIG. 2, which is connected to terminals 21 and 22. The circuit (FIG. 3A) includes light-emitting diodes Led2, Led3, Led4, Led5 and Led6 which lights up when the associated relays R1, R2, R3, R4, and R5 are operated. When R1 is on, contacts 21, 22 close and operate heater relay 42A. When R5 is on, contacts 13, 14 close existing circuit of ventilating fans D normally controlled by room thermostat 62. When R3 is on terminal 20 of 68 supplies the two damper motors 70, 72 through terminals 17 and 19 respectively. While R3 is on and R4 is on terminal 17 is off and motor 70 closes outside air dampers 36 for the de-icing mode. While R3 is on and R2 is on, terminal 19 is off and motor 72 closes inside air damper 38 for the air pressure restoring mode. Chip IC5 with three gates IC6 forms a clock 74 (FIG. 3) which generates one pulse per minute at its output 76. This pulse is fed to a de-icing counter IC7 which in turn controls an operating counter IC10. De-icing counter IC7 has pairs of terminals numbered 1 to 8, capable of being jumped by a manually-positioned jumper 78. The counter can count 1 to 8 minutes and emits a signal at the end of the time interval denoted by the jumper position, said jumper being set at 2 minutes in the illustrated example. This counter determines the number of minutes the system is in de-icing mode. Similarly, there is a counter indicated by chip IC10 (FIG. 3) for counting the number of minutes the ventilating system is operating. This counter has eight pairs of terminals for giving a signal at 10 minutes intervals, with the jumper 80 manually set at the desired number of minutes. For instance, in the example shown, the jumper is across the fifth pair of terminals indicating that a signal will be given after fifty minutes of ventilation. The terminals numbered 0 to 22 in FIG. 2 are repeated in FIGS. 3 and 3A.

The system operates as follows: below the set value for air contaminants concentration as adjusted by means of knob 64, the two dampers 36 and 38 are closed and the furnace fans D are off condition, but can operate along with the furnace under the control of thermostat 6. When the sensor 66 detects a contaminant concentration above the set value, then a signal is transmitted through terminals 7 and 8 of board 48. Referring to FIG. 3, 3A, the signal at terminal 7 closes the switching transistor IC8, which is an opto-isolator to eliminate any interference. The signal is amplified and transmitted through the various gates IC2, IC3 to operate relay 5 to close the relay contacts 13, 14 connected to the circuit and to operate relays R3, and R2 to close the relay contact 17 and 19 of the inside air damper 38 and outside air damper 36 which take an open position. Therefore, the inside air bleeded from the discharge plenum Pd is discharged to the exterior and fresh air is sucked in within the plenum Rr. This is effected until the contaminants concentration has been lowered to below the preset value.

If the outside temperature drops below 0 degree centigrade, for instance minus 5 degrees centigrade, there is danger of ice formation within the heat exchanger core 18 in the side discharging the inside humid air, because of the cold air admitted within the core 18. Heat exchange is diminished and blocking of the inside air path within the heat exchanger can be produced. In order to overcome this, the system, upon detection of a −5 degrees C. by outside temperature sensor 40, will operate in a de-icing mode as follows: a signal is transmitted at terminal 6 in FIG. 3. The VCC supply of opto-isolator switching transistor IC9 is connected through rectifier D3 and rectifier D2 and wire 82 to the clock 74 (IC5, IC6) which is arranged to generate one pulse per minute. The signal is also transmitted through rectifier diode D3 and diode D5 and wire 84 to the de-icing counter IC7 which, after the preset interval, for instance 2 minutes in the example shown, sends a signal to the adjacent gate IC6 (FIG. 3A) to stop the de-icing mode. The signal from switching transistor IC9 is also transmitted through wire 86 to the ventilating counter IC10, which, after 50 minutes, sends a signal which is amplified by transistor 88, which sends a signal by wire 90 to the switching transistor 92 which closes the B1 circuit to the relay R4. The inside air damper 38 is opened for the de-icing mode after an operating ventilating time of 50 minutes has been achieved.

Transistor 94 operates relay R5, which operates the furnace fans D. Resistance 96 decreases the current through the current regulators 98 to prevent damage to the same. The arrangement of the two gates IC4, shown at 100 form a monostable multi-vibrator which sends a pulse to reset the defrost counter IC7 and the clock 74 when the ventilating counter IC10 has counted 50 minutes or any other set time. At the end of the defrosting cycle, the output of and gate becomes high (wire 104) and transistor IC9 is no longer conducting.

Gates denoted IC3, IC4 are norgates; gates denoted IC2 are nand gates; gates denoted IC6 are and gates.

When the negative air pressure sensor 44 detects negative pressure inside the building, a signal is transmitted to terminal 3 and to opto-isolator switching transistor IC1, which sends a signal which is amplified by transistor 104. Condenser 22 prevents oscillation of the signal. The relays are operated through the gates IC2, IC3.

The arrangement is such that the following is produced. If the outside temperature is detected as being below minus 5 degrees centigrade, as measured by the outside temperature sensor 40, ventilating counter IC10 counts the number of minutes the system operates in an air-upgrading mode. After the 50 minutes, the defrost counter IC7 starts to operate and causes to take the de-icing mode, that is the outside air damper closes and the inside air damper opens, and the furnace fans start to operate, thereby hot air is discharged through the heat exchanger core for two minutes, as determined by the defrost counter.

From the foregoing, it is seen that de-icing takes place only after the system has worked for a total of fifty-minutes in the air-upgrading mode in one or more operating cycles.

If negative pressure is detected by the differential barometer 44, and if the outside air temperature is above minus 5 degrees, then no defrosting mode is necessary; the inside air damper remains closed; the outside air damper opens and the furnace fans D start to operate. If negative air pressure is detected and the outside air temperature is below minus 5 degrees, then it is found necessary to heat the incoming cold fresh air to prevent icing of the heat exchanger core when inside pressure equilibrium is being reestablished. For this purpose, the air preheater 42 is placed in operation through relay R1. The inside air damper 38 closes; the outside air damper 36 opens; the furnace fans D start to operate. The ventilating counter IC10 starts to count, and after fifty minutes, the de-icing mode starts to operate for two minutes. It is noted that the pressure equilibrium-restoring mode is contrary to the de-icing mode.

It is noted that the air contaminants sensor 56 and the humidity sensor 58 are parallel connected. Therefore, if the inside air humidity is above a set value, but the air contaminants concentration is below a set value, then the air-upgrading mode will operate, so as to decrease the inside air humidity. If the air-upgrading mode is already in operation, then this mode will continue until the humidity level has dropped below the adjusted level.

In all cases, the de-icing has priority on the pressure-restoring mode, which again has priority over the humidity-decreasing mode, and the air-quality upgrading mode.

A second embodiment, together with its electronic circuit, is shown in FIGS. 4 to 6A inclusive. As in the first embodiment, the heat exchanger casing 12 has a vertical partition 14 and a horizontal partition 16, together with a diagonally-disposed heat exchanger core 18. The outside air path is defined by the duct 20, the compartment 22, the core 18, the compartment 24 and the duct 26 which discharges outside air into the room by an outside air blower 106.

The inside air path is as follows: duct 28, compartment 30, compartment 32 and core 18, duct 34 provided with its own inside air motorized blower 108. The two blowers 106, 108 can be connected in series for a low-speed operation or in parallel for a high-speed operation. Only the outside air path is provided with a motorized damper, namely outside air damper 36 mounted in duct 20. This duct has also an outside air temperature sensor 40 and an air preheater 42, as in the first embodiment. Similarly, a differential air barometer 44 is provided. An air-contaminants sensor 56A and an air humidity sensor 58 are exposed in the room, both connected to the electronic circuit mounted in a box 110 inside the casing 12.

The air contaminants sensor 56A is sold by the company FR SAUTER AG, under code name EGQ1F001. It has an output varying between 0 and 10 volts, depending on the concentration of the air contaminants detected. The circuit board 48 is provided with led 2 (see circuit in FIG. 6A) to indicate low-speed blower operation through relay R1, led 3 to indicate high-speed blower operation through relay R2, led 5 to indicate operation of the de-icing time through relay R4, led 6 to indicate operation of the blower through relay R5 and led 4 indicating that the damper is in open position through relay R3.

Figure 6:
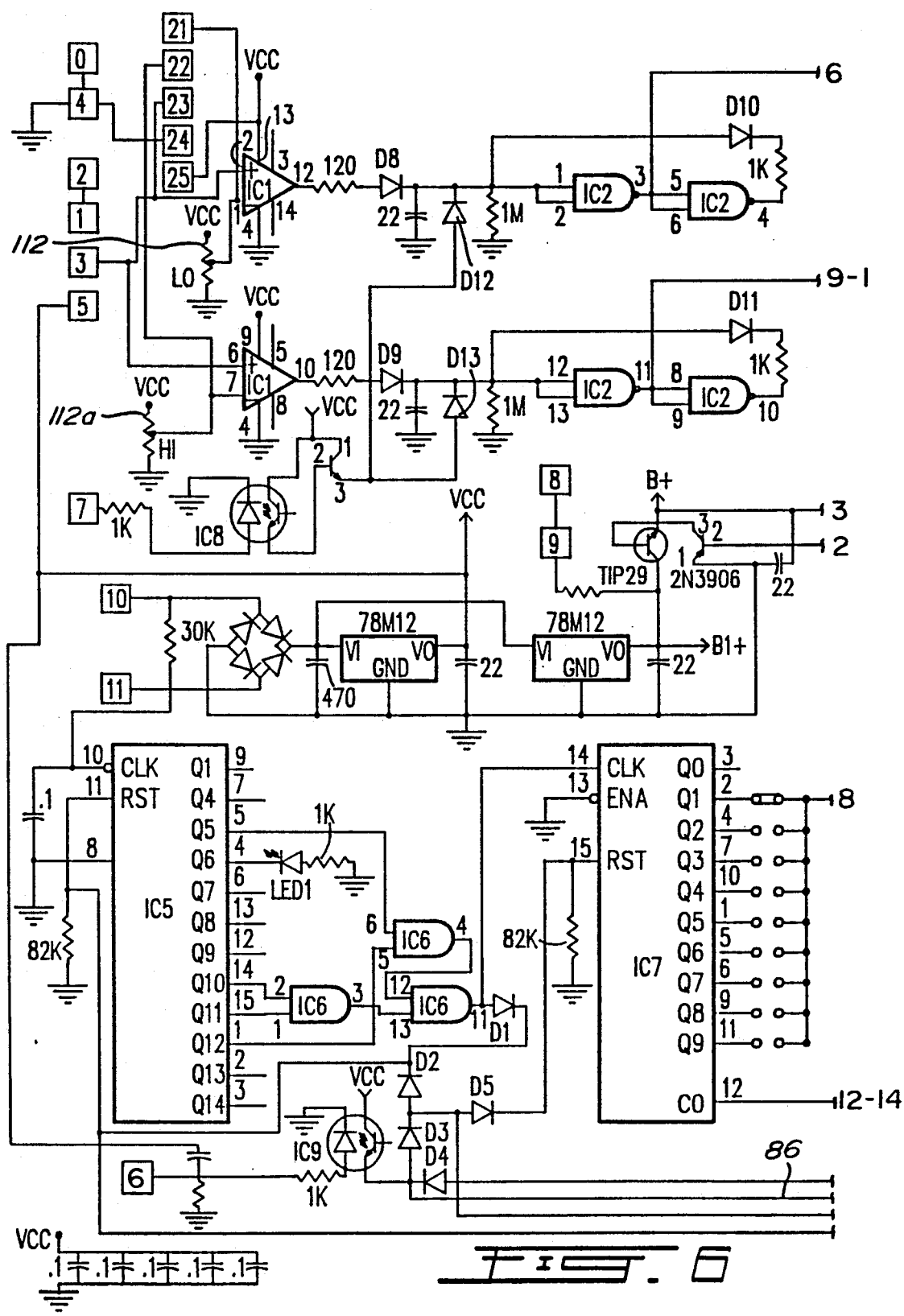
FIGS. 6 and 6a show the diagram of the integrated circuit for the second embodiment.
Figure 6A:
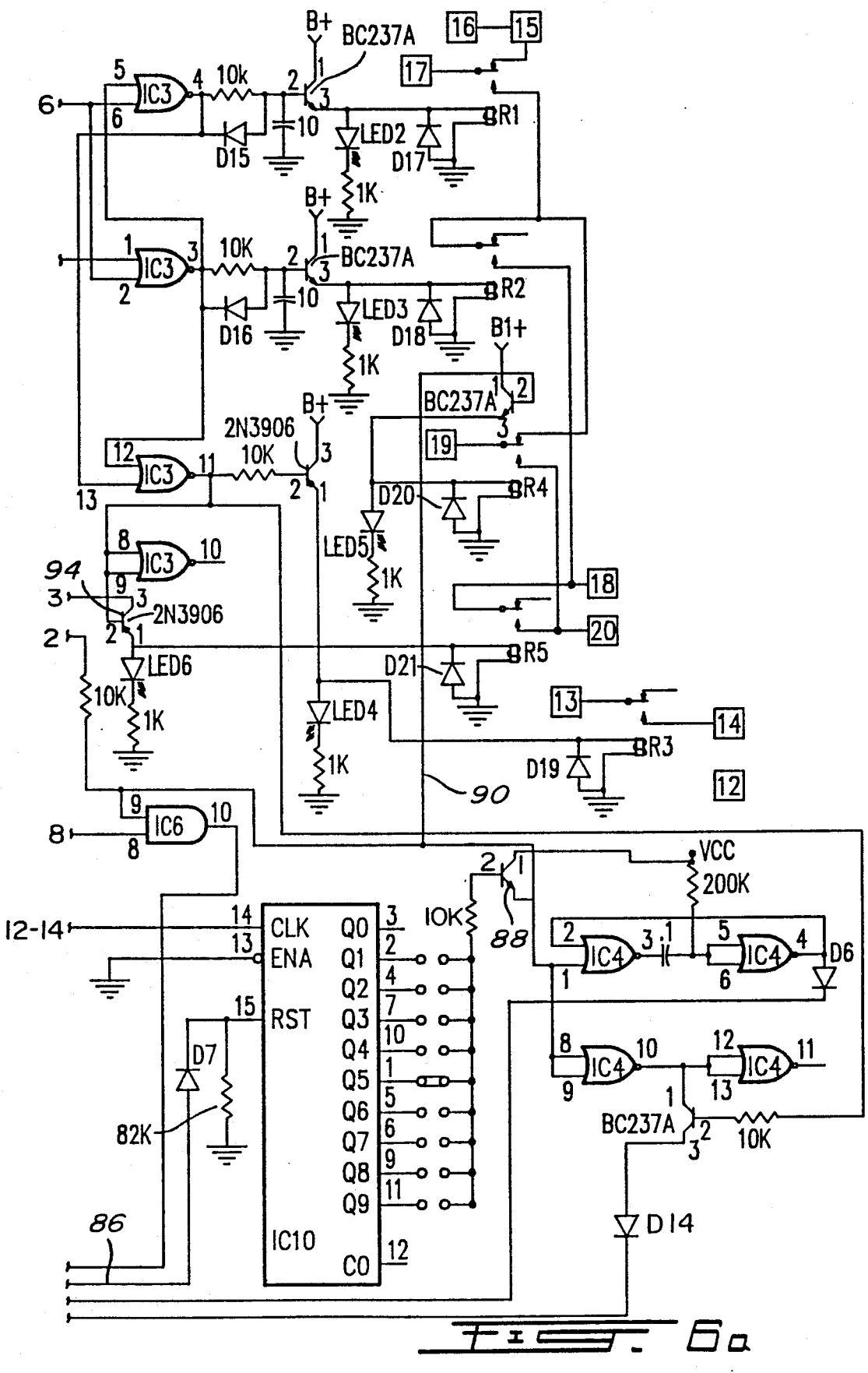

In the schematic of FIG. 5 and the circuits of FIG. 6 and 6A, there is no provision for the differential barometer 44 and for the preheater 42 but it is understood that the circuit of FIGS. 3 and 3A associated with the differential barometer 44 and the preheater 42 can be incorporated in the circuit of the second embodiment.

In FIG. 5, it is seen that the motor of the damper 36 is connected to terminals 12, and 14, being supplied by the transformer 68 and also the outside air blower motor 106 and inside air blower motor 108 are connected to terminals 17, 18, and 16, 19, respectively.

The main differences in the circuits of FIGS. 6 and 6A, compared to the circuit of FIGS. 3 and 3A, are as follows: relays R1 and R2 are for low-speed and high-speed operation of the two blowers; relay R4 is for the de-icing mode; relay R5 supplies electricity to the two blowers; relay R3 is to operate the motor of the damper to open the same.

When the sensor 56A senses an air contaminant concentration sufficient to generate an output sign of, for instance, three volts at terminal 3, this value being determined by variable resistor 112, the top comparator IC1 will send a signal through the rectifier diode D8, the time delay circuit consisting of the condenser 22 and rectifier D12 to prevent oscillation of the signal, and through the gates IC2, IC3 which operate relay R1 and relay R5 for low-speed operation of the two blowers in an air-upgrading mode, the damper being also open through relay R3. When the air contaminants concentration is such that the sensor emits a signal above 7 volts, then the lower comparator IC1 will emit a signal as determined by its variable resistor 112A, so as to cause the system to operate in an air-upgrading mode as above, but with the ventilators at high speed, relay R2 being closed instead of relay R1. When the signal is below three volts, blower operation is cut off and the damper closes.

If the humidity sensor detects inside humidity above, for instance, 40%, then the blowers start at high speed and the damper opens. When the humidity drops below 40%, the system shuts off. The de-icing mode and the negative pressure mode are as in the first embodiment. Also, the de-icing mode has priority on the negative pressure mode, which in turn has priority on the humidity mode, which in turn has priority on the air-upgrading mode. In the circuit of the second embodiment, it is noted that the relative humidity sensor is connected at terminal 7.

In both embodiments, both the de-icing time and the time interval between de-icing are adjustable by means of the adjustable counters IC7, IC10 and also it is possible to adjust at which point ventilation will start to upgrade the air quality. Therefore, the systems can be adapted to various types and sizes of building and also in accordance with the number of occupants and the type of operation being carried out in the building.

I claim:

1. A ventilation system for introducing outside air into an enclosed space and for exhausting to the outside stale inside air from said space, comprising a heat exchanger having a core and separate inside and outside air paths in heat exchange relation within said core, said inside air path having an air inlet communicating with said enclosed space and an air outlet communicating with the outside, said outside air path having an air inlet communicating with the outside, and an air outlet communicating with said enclosed space, power-operated inside and outside air-circulating means for circulating air in said inside and outside air paths, respectively, from said air inlets towards said air outlets, power-operated damper means including an outside air damper in said outside air path movable between a normally-closed position, and an open position, preventing and allowing air circulation in said outside air path, respectively, an electric circuit including an air contaminants sensor located in said enclosed space externally of said heat exchanger and directly exposed to the inside air in said enclosed space, said air contaminants sensor generating a voltage output generally proportional to the concentration of air contaminants sensed in the inside air in said enclosed space and first circuit means to operate said system in an inside air quality upgrading mode upon said sensor generating a voltage above a predetermined value, said air quality upgrading mode including opening said damper means and operation of said air-circulating means for lowering the proportion of air contaminants in said enclosed space, said first circuit means stopping operation of said air-circulating means and allowing closing of said outside air damper upon said sensor generating a voltage below said predetermined value.

2. A ventilation system as defined in claim 1, wherein said damper means further include a power operated inside air damper in said inside air path, said first circuit means causing opening and allowing closing of said inside air damper upon said sensor generating a voltage above and below said predetermined value respectively.

3. A ventilation system as defined in claim 1, wherein said first circuit means operate said air-circulating means at a low and a high speed, respectively, upon production of a lower and a higher voltage output by said air contaminants sensor respectively.

4. A ventilation system as defined in claim 1, further including an outside air temperature sensor exposed to outside air and second circuit means to operate said system in a heat exchanger de-icing mode and including a de-icing mode time counter, said de-icing mode including closing said outside air damper and operation of said inside air circulating means for an operating time determined by said de-icing mode time counter when said air temperature sensor detects an outside air temperature below a preset temperature.

5. A ventilation system as defined in claim 4, wherein said de-icing mode time counter is manually adjustable to adjust said operating time.

6. A ventilation system as defined in claim 5, wherein said second circuit means further includes an air quality upgrading mode operating time counter counting the time duration said system is in air quality upgrading mode and giving a signal at the end of said time duration, said second circuit means causing operation of said system in said heat-exchanger de-icing mode only upon production of said signal.

7. A ventilation system as defined in claim 5, wherein said second circuit means further includes an air quality upgrading mode time counter counting the duration of operation of the system in an air quality upgrading mode for a preset total time, while outside air is detected below said preset temperature and even if this operation in air quality upgrading mode is repeated instead of being continuous, and causing said system to operate in said heat-exchanger de-icing mode, each time said total time is reached, said air quality upgrading mode time counter and said de-icing time counter automatically resetting to zero after completion of the de-icing mode operation.

8. A ventilation system as defined in claim 7, further including a differential air pressure sensor exposed to both said outside and said inside air and emitting a negative air pressure signal when detecting an inside air pressure below the pressure of said outside air, said differential pressure sensor together with third circuit means connected in said circuit to operate said system in an air pressure equalizing mode when said negative air pressure signal is produced by said differential air pressure sensor, said air pressure equalizing mode comprising opening said outside air damper means and operation of said outside air circulation means.

9. A ventilation system as defined in claim 8, further including overriding means in said circuit for causing said air pressure equalizing mode to override said air quality upgrading mode and said de-icing mode to override said air pressure equalizing mode.

10. A ventilation system as defined in claim 1, further including an air humidity sensor exposed to said inside air and an additional circuit means both connected within said circuit to operate said system in an inside air-dehumidifying mode when a preset humidity level is detected by said air-humidity sensor, said inside air dehumidifying mode including opening said damper means and operating said first and second air circulating means for causing exhaust of said inside air and admission of said outside air.

11. A ventilation system as defined in claim 9, further including an inside air-humidity sensor connected in parallel with said air contaminants sensor, and causing said system to operate in said air quality upgrading mode upon detection of a preset humidity level.

12. A ventilation system as defined in claim 9, further including an outside air preheater located within said heat exchanger outside air circulating path just upstream of the core of said heat exchanger, and further including an additional circuit means to operate said preheater when said system is in air pressure equalizing mode and when said outside air temperature sensor detects an outside air temperature below a preset temperature.

13. A ventilation system as defined in claim 6, wherein said air quality upgrading mode operating time counter is manually adjustable independently of the adjustability of the de-icing mode time counter.

14. A ventilation system for introducing outside air into an enclosed space and for exhausting to the outside stale inside air from said space, comprising a heat exchanger having a core and separate inside and outside air paths in heat exchange relation within said core, said inside air path having an air inlet communicating with said enclosed space and an air outlet communicating with the outside, said outside air path having an air inlet communicating with the outside, and an air outlet communicating with said enclosed space, power-operated inside and outside air-circulating means for circulating air in said inside and outside air paths, respectively, from said air inlets towards said air outlets, power-operated damper means including an outside air damper in said outside air path movable between a normally-closed position, and an open position, preventing and allowing air circulation in said outside air path, respectively, an electric circuit including an air contaminants sensor located in said enclosed space externally of said heat exchanger and directly exposed to the inside air in said enclosed space, said air contaminants sensor generating a voltage output generally proportional to the concentration of air contaminants sensed in the inside air in said enclosed space and first circuit means to operate said system in an inside air quality upgrading mode upon said sensor generating a voltage above a predetermined value, said air quality upgrading mode including opening said damper means and operation of said air-circulating means for lowering the proportion of air contaminants in said enclosed space, said first circuit means stopping operation of said air-circulating means and allowing closing of said outside air damper upon said sensor generating a voltage below said predetermined value and further including an outside air temperature sensor exposed to outside air and second circuit means to operate said system in a heat exchanger de-icing mode and including a de-icing mode time counter, said de-icing mode including closing said outside air damper and operation of said inside air circulating means for an operating time determined by said de-icing mode time counter when said air temperature sensor detects an outside air temperature below a preset temperature.

15. A ventilation system as defined in claim 14, wherein said de-icing mode time counter is manually adjustable to adjust said operating time.

16. A ventilation system as defined in claim 15, wherein said second circuit means further includes an air quality upgrading mode operating time counter counting the time duration said system is in air quality upgrading mode and giving a signal at the end of said time duration, said second circuit means causing operation of said system in said heat-exchanger de-icing mode only upon production of said signal.

17. A ventilation system as defined in claim 15, wherein said second circuit means further includes an air quality upgrading mode time counter counting the duration of operation of the system in an air quality upgrading mode for a preset total time, while outside air is detected below said preset temperature and even if this operation in air quality upgrading mode is repeated instead of being continuous, and causing said system to operate in said heat-exchanger de-icing mode, each time said total time is reached, said air quality upgrading mode time counter and said de-icing time counter automatically resetting to zero after completion of the de-icing mode operation.

18. A ventilation system as defined in claim 17, further including a differential air pressure sensor exposed to both said outside and said inside air and emitting a negative air pressure signal when detecting an inside air pressure below the pressure of said outside air, said differential pressure sensor together with third circuit means connected in said circuit to operate said system in an air pressure equalizing mode when said negative air pressure signal is produced by said differential air pressure sensor, said air pressure equalizing mode comprising opening said outside air damper means and operation of said outside air circulation means.

19. A ventilation system as defined in claim 18, further including overriding means in said circuit for causing said air pressure equalizing mode to override said air quality upgrading mode and said de-icing mode to override said air pressure equalizing mode.

20. A ventilation system as defined in claim 19, further including an inside air-humidity sensor connected in parallel with said air contaminants sensor, and causing said system to operate in said air quality upgrading mode upon detection of a preset humidity level.

21. A ventilation system as defined in claim 19, further including an outside air preheater located within said heat exchanger outside air circulating path just upstream of the core of said heat exchanger, and further including an additional circuit means to operate said preheater when said system is in air pressure equalizing mode and when said outside air temperature sensor detects an outside air temperature below a preset temperature.

22. A ventilation system as defined in claim 16, wherein said air quality upgrading mode operating time counter is manually adjustable independently of the adjustability of the de-icing mode time counter.

* * * * *